United States Patent [19]

Saito et al.

[11] Patent Number: 4,982,973
[45] Date of Patent: Jan. 8, 1991

[54] FRONT FENDER FOR FRONT-FORKED VEHICLES

[75] Inventors: Kazuhiko Saito, Tokyo; Kazuhiko Yokoyama; Yoshihiro Kimura, both of Saitama, all of Japan

[73] Assignee: Honda Giken Kogyo Kabushiki Kaisha, Tokyo, Japan

[21] Appl. No.: 469,716

[22] Filed: Jan. 24, 1990

Related U.S. Application Data

[63] Continuation of Ser. No. 783,447, Oct. 3, 1985, abandoned.

[30] Foreign Application Priority Data

Nov. 8, 1984 [JP] Japan ............................ 59-235694

[51] Int. Cl.⁵ .............................................. B60K 11/06
[52] U.S. Cl. ................................ 280/152.1; 180/229; 180/68.1; 180/903; 296/180.1
[58] Field of Search .................. 180/68.1, 68.3, 219, 180/229, 903; 280/152.1, 152.2, 152.3; 296/180.1

[56] References Cited

U.S. PATENT DOCUMENTS

| 1,685,882 | 10/1928 | Pawsat | 280/152.1 |
| 4,416,348 | 11/1983 | Fukui | 180/68.1 X |
| 4,458,909 | 7/1984 | Morioka | 280/152.2 X |
| 4,486,046 | 12/1984 | Whitney et al. | 280/154.5 R X |
| 4,564,081 | 1/1986 | Hamane et al. | 180/68.1 X |
| 4,822,067 | 4/1989 | Matsuo et al. | 180/68.1 X |

FOREIGN PATENT DOCUMENTS

| 1039385 | 9/1958 | Fed. Rep. of Germany ... 280/152.1 |
| 41213 | 3/1982 | Japan ............................... 180/229 |
| 58-30788 | 7/1983 | Japan . |
| 59-19489 | 6/1984 | Japan . |

Primary Examiner—Charles A. Marmor
Assistant Examiner—Michael Mar
Attorney, Agent, or Firm—Lyon & Lyon

[57] ABSTRACT

A front fender for a front-forked vehicle includes longitudinally extending air passages having inlets which extend in front of the forwardly exposed portions of the vehicle fork to direct air around the fork and guide same toward the vehicle engine.

9 Claims, 5 Drawing Sheets

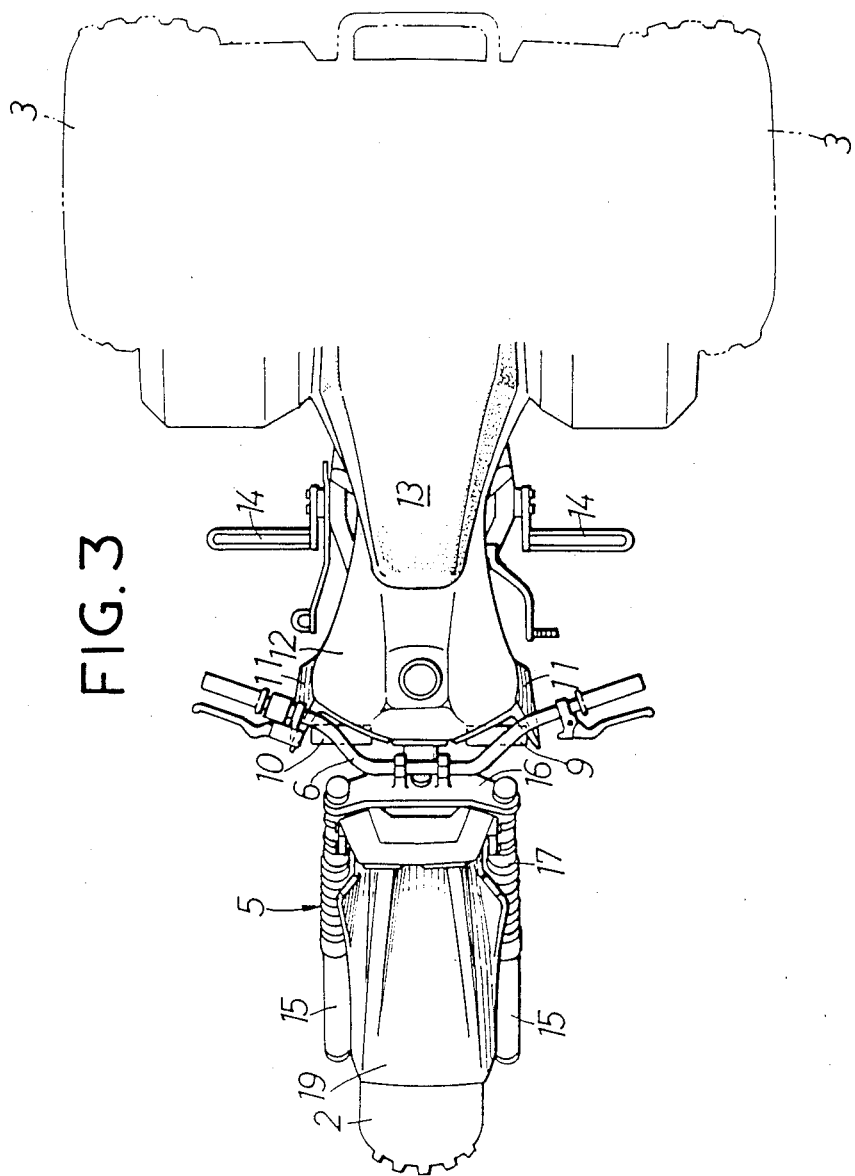

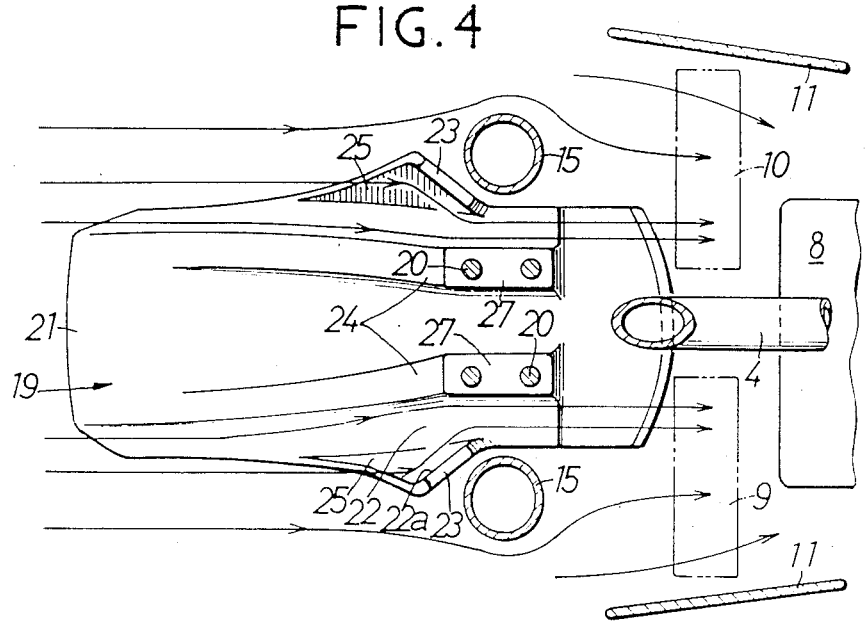
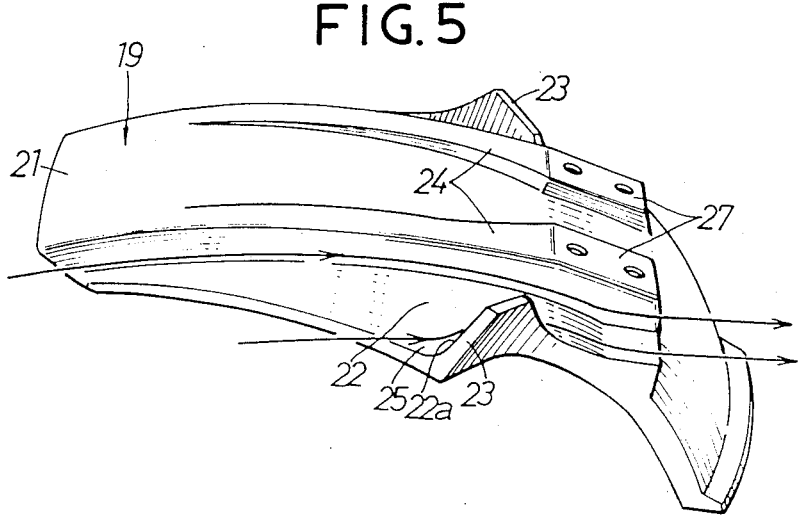

FRONT FENDER FOR FRONT-FORKED VEHICLES

This application is a continuation of application Ser. No. 783,447, filed Oct. 3, 1985 now abandoned.

BACKGROUND OF THE INVENTION

The field of the present invention is front fenders for front-forked vehicles such as motorbicycles, motortricycles or the like.

In conventional front fenders, it is known to provide a pair of parallel walls in the longitudinal direction of the fender which rise from the upper surface of the fender body to define air passages. Such front fenders are described, for example, in Japanese Utility Model Publication No. 30788/83. During vehicle operation, air flowing along the upper surface of the fender body is guided or directed by the passages toward the engine. However, with such fenders, air flowing toward the front fork is interrupted by the fork legs. Accordingly, a substantial portion of the available air flow may not reach the engine directly and cannot effectively contribute to engine cooling.

SUMMARY OF THE INVENTION

The present invention is directed to a front fender for a front-forked vehicle wherein air passages are provided for channeling air flow around and past the front fork in a continuous stream. The air passage includes inlets which extend in front of the forwardly exposed portions of the fork legs. Air flowing toward the fork legs is collected in the inlets and thereafter joins the air flowing adjacent the fork legs so as to a result, the quantity of cooling air directed toward the engine is increased.

It is therefore an object of the present invention to provide a front fender of the type described above wherein the air flowing toward the front fork leg can be retrieved and guided or directed toward the engine to promote cooling.

BRIEF DESCRIPTION OF THE DRAWINGS

FIG. 3 is a plan view of the motortricycle of FIG. 1.

FIG. 4 is an enlarged sectional view taken along the line IV—IV in FIG. 1.

FIG. 5 is a perspective view of the front fender depicted in FIG. 4.

DETAILED DESCRIPTION OF THE PREFERRED EMBODIMENT

Figure 1:
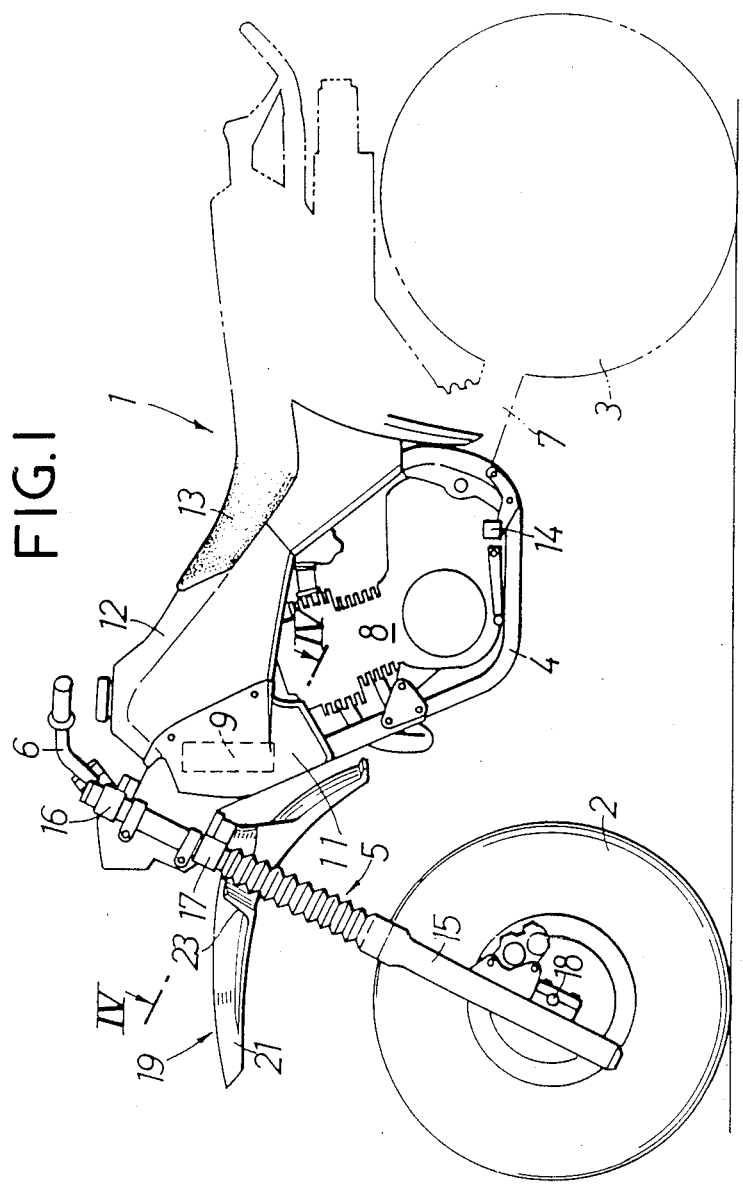
FIG. 1 is a side view of a motortricycle incorporating a first embodiment of the present invention.
Figure 2:
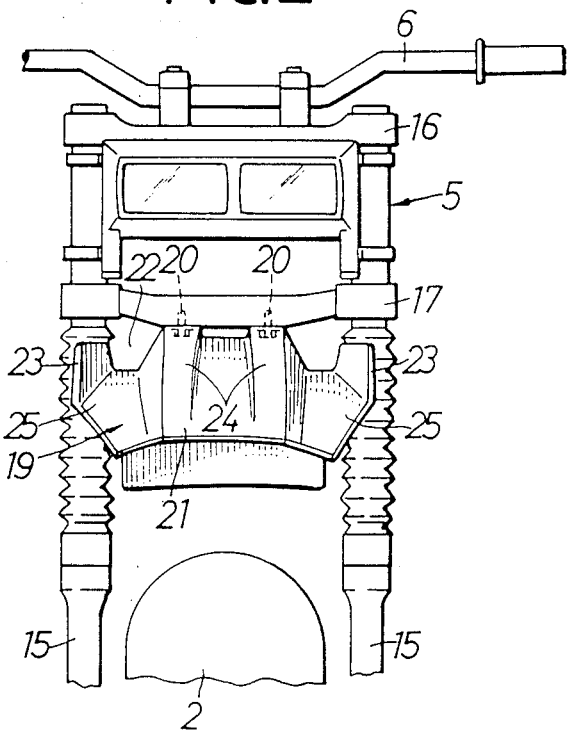
FIG. 2 is an enlarged front view in part of FIG. 1

Referring first to FIGS. 1 to 3, which illustrate a first embodiment of the present invention, there is shown a motortricycle 1 which includes a front wheel 2 and a pair of rear wheels 3. The wheels 2 and 3 have extremely low pressure tires, called balloon tires, mounted thereon.

The front wheel 2 is carried on a front fork 5, which is connected to the front portion of a vehicle body frame 4 in conventional fashion. A steering handle 6 is mounted on the front fork 5.

The rear wheels 3 are attached to a rear fork 7, which is pivotally attached to the rear portion of the frame 4 and supported by conventional suspension means. An engine 8 is carried on the frame 4 at the intermediate portion thereof between the front and rear wheels 2 and 3. The engine drives the rear wheels 3 through a chain or shaft.

As shown in FIGS. 4, mounted on the frame 4, in front of the engine 8, are a radiator 9, an oil cooler 10, and shroud plates 11. A fuel tank 12 and a saddle 13 rearwardly adjacent thereto are mounted on the frame 4 above the engine 8. A step 14 is securely mounted on the lower portion of the body frame 4. As best shown in FIGS 1 and 2, the front fork 5 is constituted of a pair of left and right telescopic fork legs 15 and a pair of upper and lower bridges 16 and 17 connecting the fork legs to each other at the upper portions thereof. A steering shaft, not shown, connects the front fork 5 to the front end of the frame An axle 18 of the wheel 2 is journaled at its opposite ends for attachment to the respective lower ends of the fork legs 15.

The lower bridge 17 has a front fender 19 of synthetic resin or like material secured on the underside thereof by bolts 20. Referring to FIGS. 4 and 5, the front fender 19 is comprised of a molded fender body 21 for covering the upper portion of the front wheel 2. Rising from the upper surface of the body 21 is a pair of longitudinally extending ribs 24. Rib mounting bosses 27 located at the rear portions of the ribs 24 are fitted on the underside of the lower bridge 17 and secured thereto by bolts 20. Outwardly from the ribs 24, a pair of guide walls 23 rise from the opposite side edges of the fender body 21. The guide walls 23, together with the ribs 24, define a pair of air passages 22 extending above the upper surface of the fender body 21. To further define the air passages 22 and in particular enlarged, or flared, inlets 22a thereof, the fender body 21 also includes substantially horizontal projections 25 that extend around the forwardly exposed portions of the respective fork legs 15. To complete the inlets, the guide walls 23 are extended along the edges of the projections 25, rising therefrom, to terminate in front of the forwardly exposed portions of the respective fork legs 15. Thus, the air passages 22 are defined so that the inlets 22a are enlarged toward the front of the vehicle and extend in front of the forwardly exposed portions of the fork legs 15 to channel air around the fork legs and direct same toward the engine.

During vehicle travel air flowing toward the front of the fork legs 15 is guided inside the fork legs 15 by the projections 25 and the guide walls 23 and thereafter joins with the air flowing along the upper surface of the fender body 21 adjacent the fork legs. Consequently, the quantity of available air flow is increased, promoting increased cooling of the radiator 9, the oil cooler 10, and the engine 8.

Figure 6:
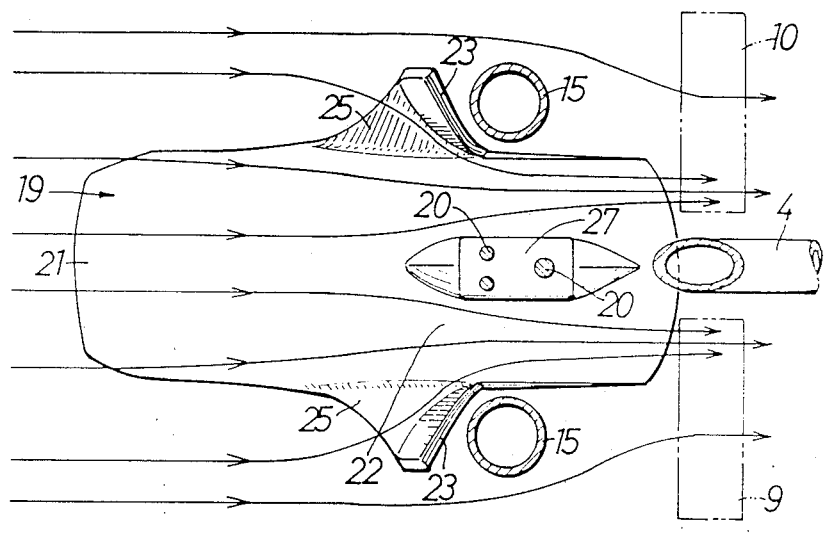
FIG. 6 is a sectional view of a fender representing a second embodiment of the present invention.
Figure 7:
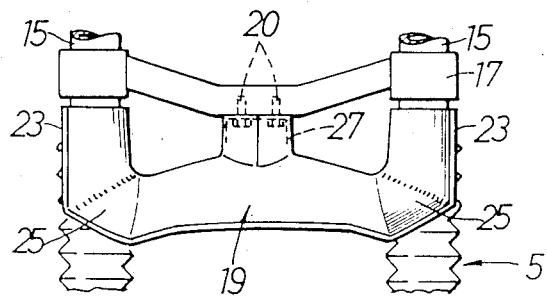
FIG. 7 is a front view in part of FIG. 6.

FIGS. 6 and 7 illustrate a second embodiment of the present invention having a similar constitution to that of the first embodiment except that a single streamlined mounting portion 27 is provided on the upper surface of the fender body 21 at the central portion thereof. In these figures, the reference numbers correspond to the numbered parts of the first embodiment. According to this embodiment, the air passages 22 having a larger sectional area than in the previous embodiment are provided to enable a still larger amount of air to be guided or directed toward the engine 8.

Thus, a front fender for front-forked vehicles is disclosed comprising air passages having inlets that extend in front of the forwardly exposed portions of the fork legs. The air flowing toward the fork legs is collected in the air passages and directed to the engine, thereby increasing the amount of the air available for cooling the engine. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A front fender for a vehicle having a centrally located engine and a fork having a pair of exposed, mutually spaced fork elements located forwardly of said engine, comprising:

a fender body having an upper surface, said fender body extending across substantially the entire width of said fork with said upper surface defining an air passage between said fork elements, said air passage having an air inlet portion defined by a substantially horizontal projection extending laterally outwardly from each side of said fender body, each horizontal projection being located in front of a respective one of said fork elements, and a guide wall rising substantially vertically from a rearward edge of each said projection, each said guide wall being located in front of the forwardly exposed portion of a respective one of said fork elements and extending rearwardly and inwardly across substantially the entire width of said fork elements to guide air toward the engine from in front of the fork; and said fender body having an upper surface with a raised portion located between said guide walls, said raised portion extending vertically from said upper surface and longitudinally of said air passage so as to regulate air flow toward said engine.

2. The fender set forth in claim 1 wherein said raised portion is defined by longitudinally extending rib means that cooperates with said guide walls to divide said air passage into spaced, substantially parallel air flow paths.

3. The fender set forth in claim 2 wherein said rib means comprises a pair of mutually spaced ribs, each of which cooperates with one of said guide walls for defining said air flow paths.

4. The fender set forth in claim 2 wherein said rib means comprises a streamlined shaped rib centrally disposed between said guide walls defining said air flow paths.

5. The fender set forth in claim 2 including means on said rib means for connecting said fender to said vehicle.

6. A front fender for a vehicle having a centrally located engine and a front fork containing a pair of exposed, mutually spaced fork elements located forwardly of said engine comprising:

a fender body having an upper surface defining a longitudinally extending air passage therein, said air passage being enlarged toward the front of the vehicle and having an air inlet portion defined by a substantially horizontal projection extending longitudinally of said passage and having its widest lateral extent intermediate the longitudinal ends of said body at a position forwardly of the vehicle fork, and oppositely spaced guide walls rising substantially vertically from a rearward edge of said projection adjacent its widest lateral extent, each said guide wall extending laterally inwardly of said body from said rearward edge across substantially the entire width of said fork elements to obstruct the forwardly exposed portion of the adjacent fork element to guide air from forwardly of said fork between the respective elements thereof to said engine; and said fender body upper surface containing a raised portion extending vertically therefrom and longitudinally of said air passage so as to direct air flow in spaced, substantially parallel paths toward said engine.

7. The fender set forth in claim 6 wherein said raised portion is defined by longitudinally extending rib means that cooperates with said guide walls to divide said air passage into spaced, substantially parallel air flow paths.

8. The fender set forth in claim 7 wherein said rib means comprises a pair of mutually spaced ribs, each of which cooperates with one of said guide walls for defining said air flow paths.

9. The fender set forth in claim 77 wherein said rib means comprises a streamlined shaped rib centrally disposed between said guide walls defining said air flow paths.

* * * * *

UNITED STATES PATENT AND TRADEMARK OFFICE
CERTIFICATE OF CORRECTION

PATENT NO. : 4,982,973
DATED : January 8, 1991
INVENTOR(S) : SAITO et al.

It is certified that error appears in the above-identified patent and that said Letters Patent is hereby corrected as shown below:

In claim 9 (column 4, line 43) delete "77" and insert therefor -- 7 --.

Signed and Sealed this

Fifteenth Day of September, 1992

Attest:

DOUGLAS B. COMER

*Attesting Officer*　　　Acting Commissioner of Patents and Trademarks